United States Patent
Dotsenko et al.

(10) Patent No.: US 11,830,140 B2
(45) Date of Patent: Nov. 28, 2023

(54) METHODS AND SYSTEMS FOR 3D MODELING OF AN OBJECT BY MERGING VOXELIZED REPRESENTATIONS OF THE OBJECT

(71) Applicant: Verizon Patent and Licensing Inc., Basking Ridge, NJ (US)

(72) Inventors: Elena Dotsenko, Princeton, NJ (US); Vidhya Seran, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 113 days.

(21) Appl. No.: 17/488,516

(22) Filed: Sep. 29, 2021

(65) Prior Publication Data

US 2023/0098187 A1    Mar. 30, 2023

(51) Int. Cl.
*G06T 17/20*    (2006.01)

(52) U.S. Cl.
CPC .......... *G06T 17/20* (2013.01); *G06T 2200/04* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 8,462,155 B1 * | 6/2013 | Allen | ...................... | G06T 15/20 345/420 |
| 10,825,244 B1 * | 11/2020 | Vorobyov | ........... | G06F 16/2219 |
| 2005/0174346 A1 * | 8/2005 | Park | ........................ | G06T 15/04 345/422 |
| 2012/0154400 A1 * | 6/2012 | Steen | ...................... | G06T 7/187 345/424 |
| 2015/0002636 A1 * | 1/2015 | Brown | .................. | H04N 13/356 348/47 |
| 2015/0161818 A1 * | 6/2015 | Komenczi | ............ | H04N 13/296 348/43 |
| 2017/0116781 A1 * | 4/2017 | Babahajiani | .......... | G06T 15/506 |
| 2017/0228885 A1 * | 8/2017 | Baumgartner | ....... | H04N 13/204 |
| 2017/0236333 A1 * | 8/2017 | Tepmongkol | ...... | G06Q 30/0643 345/419 |

(Continued)

OTHER PUBLICATIONS

Matsuyama, Takashi, et al. "Real-time dynamic 3-D object shape reconstruction and high-fidelity texture mapping for 3-D video." IEEE Transactions on Circuits and Systems for Video Technology 14.3 (2004): 357-369. (Year: 2004).*

*Primary Examiner* — Sultana M Zalalee

(57) ABSTRACT

An illustrative 3D modeling system generates a first voxelized representation of an object with respect to a voxel space and a second voxelized representation of the object with respect to the voxel space. Based on a first normal of a first voxel included in the first voxelized representation and a second normal of a second voxel included in the second voxelized representation, the 3D modeling system identifies a mergeable intersection between the first and second voxels. Based on the first and second voxelized representations, the 3D modeling system generates a merged voxelized representation of the object with respect to the voxel space. The merged voxelized representation includes a single merged voxel generated, based on the identified mergeable intersection, to represent both the first and second voxels. Corresponding methods and systems are also disclosed.

20 Claims, 11 Drawing Sheets

(56) References Cited

U.S. PATENT DOCUMENTS

| | | | |
|---|---|---|---|
| 2018/0268598 A1* | 9/2018 | Lefebvre | B33Y 10/00 |
| 2019/0370989 A1* | 12/2019 | Zhao | G06T 17/00 |
| 2021/0110599 A1* | 4/2021 | Fang | G06T 7/55 |
| 2021/0158016 A1* | 5/2021 | Yao | G06T 7/11 |

* cited by examiner

METHODS AND SYSTEMS FOR 3D MODELING OF AN OBJECT BY MERGING VOXELIZED REPRESENTATIONS OF THE OBJECT

BACKGROUND INFORMATION

In a variety of entertainment, educational, occupational, promotional, and/or other applications and use cases, it is desirable to model various three-dimensional (3D) objects and scenes. For example, by modeling 3D objects such as people, furnishings, walls, floors, and ceilings in a real-world room, a system may provide a virtual reality experience associated with the real-world room and the objects included therein to a user who is located somewhere other than the real-world room. As another example, by creating a model of a real 3D object (e.g., a person, an animal, an inanimate object, etc.), a system may provide a user an augmented reality experience involving that 3D object. For instance, the 3D model may be inserted as an augmentation into a real-world environment the user is in to make it appear as if the object is present where the object is not actually present, or the model may be represented within a virtual reality world being experienced by the user. In other examples, graphical presentation systems may present 3D representations of modeled 3D objects for various other types of use cases including video games, film special effects, educational materials, and so forth.

As 3D models are generated, it is desirable for the 3D modeling to be performed as accurately, efficiently, and quickly as possible (e.g., in real time for certain applications). Additionally, it is desirable for 3D models to be robust, lifelike, and convenient to work with so as to be attractive when presented to users and so as to flexibly facilitate various different types of follow-on processing for which the 3D models may be used.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
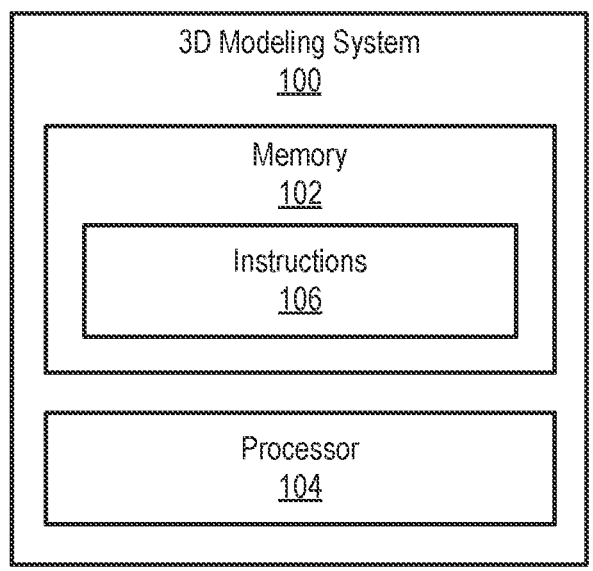
FIG. 1 shows an illustrative 3D modeling system for 3D modeling of an object by merging voxelized representations of the object according to embodiments described herein.

Methods and systems for three-dimensional (3D) modeling of an object by merging voxelized representations of the object are described herein. As mentioned above, there are a variety of applications and use cases in which it is desirable for various real-world objects to not only be photographed and/or captured on video (i.e., to thereby model the objects in two dimensions (2D)), but to further be modeled in 3D. In this way, 3D models of an object may be presented in advanced forms of media content such as in extended reality content (e.g., virtual reality content, augmented reality content, etc.) or other types of content in which objects can be observed from arbitrary viewpoints in a 3D environment (e.g., video games, movie special effects from different camera angles, etc.).

3D modeling for a real-world object may involve capturing intensity data (e.g., color data, grayscale data, etc.) and depth data for the object from multiple viewpoints positioned around the object. For example, the viewpoints may be positioned so as to surround the object on various sides such that intensity and depth data captured from each viewpoint may partially overlap with data captured from other viewpoints and may represent the object, in the aggregate, from angles 360° around the object. Based on this data, alignment operations may be performed (e.g., based on overlapping regions) to construct a single, unified representation of the surface geometry of the object.

Depth data captured from a particular viewpoint may be organized as a partial point cloud representation for the surfaces of the object that are visible from the particular viewpoint. For two such partial point cloud representations that are adjacent to one another and each represent an overlapping region of the object, an algorithm such as an iterative closest point (ICP) algorithm (or another suitable algorithm) may be employed to register and align the partial point cloud representations to a same geometric coordinate space. By repeating this operation for depth data captured from viewpoints all around the object, a full point cloud representation of the object may be generated with respect to the coordinate space and this point cloud representation may be used in various ways as may serve a particular application.

Unfortunately, point cloud representations of an object have various limitations that make them less than ideal for many uses. As one example, a point cloud representation does not have the appearance of a solid object, but as a grouping of points, making it inadequate for presentation to an end user if the goal is to present a likeness of the originally-modeled real-world object. This limitation of point clouds may be addressed by converting the full point cloud representation to a more solid and stable type of representation such as a voxelized representation or a textured mesh representation.

Unfortunately, certain other limitations of point clouds may persist even when a full point cloud constructed in this way is converted into another type of model. For instance, from moment to moment, various potential defects or flaws in the way that points are captured, registered, correlated, and/or otherwise processed during the 3D point cloud modeling operations may give surfaces a jittery or "fuzzy" quality that detracts from their accuracy and usefulness. This is a natural consequence of the same surface points, when captured from frame to frame (e.g., from moment to moment as a sequence of frames depicting the object is captured), shifting slightly in space so as to cause the surface to glitch, vibrate, blink in and out, and/or otherwise reveal artifacts of the capture and 3D modeling process.

To address this issue of jitter or surface inconsistency, as well as other limitations of conventional 3D modeling techniques, methods and systems described herein abstain from merging point clouds in favor of merging voxelized data. For example, as will be described in more detail below, rather than merging point clouds captured from different viewpoints and converting those into a mesh representation, methods and systems described herein operate by converting each partial point cloud representation of an object into a partial voxelized representation of the object and then merging the partial voxelized representations to form a merged voxelized representation of the object (e.g., a full voxelized representation of the object).

As will further be described in detail below, the voxel space into which partial voxelized representations described herein are merged may be implemented as a linked voxel space such that certain of the voxels may store links to other non-neighboring voxels. A full voxelized representation of an object generated in this type of linked voxel space may be readily converted to a mesh representation (e.g., a textured mesh representation) based on the links stored in each voxel. Moreover, this registration procedure may help ensure global consistency from any point of view, which may serve as a large improvement on conventional registration methods such as described above, which do not provide globally consistent models (e.g., due to accumulated registration errors) and in which such errors can build up to cause the final model to become inconsistent on one side or another. In contrast to conventional 3D modeling techniques, methods and systems described herein provide that each surface of the object is represented with a consistent view with which all the other surfaces can align, thereby eliminating jitter and resulting in efficient (e.g., rapidly generated), solid, consistent, accurate, temporally continuous (e.g., non-jittery, non-glitchy), and lifelike 3D models of objects modeled using these novel techniques.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems for 3D modeling of an object by merging voxelized representations of the object may provide any of the benefits mentioned above, as well as various additional and/or alternative benefits that will be described and/or made apparent below.

FIG. 1 shows an illustrative 3D modeling system 100 ("system 100") for 3D modeling of objects by merging voxelized representations of the objects in accordance with principles described herein. System 100 may be implemented by computer resources such as processors, memory facilities, storage facilities, communication interfaces, and so forth. For example, as will be described in more detail below, system 100 may be partially or fully implemented within graphics presentation devices used by end users (e.g., user equipment (UE) devices, head-mounted or hand-held extended reality presentation devices, mobile devices such as smartphones or tablet devices, personal computers, or other equipment used directly by end users), by server-side, multi-access computing systems separate from the graphics presentation devices, or by any other suitable computing systems as may serve a particular implementation. In some examples, at least part of system 100 may be implemented by distributed computing systems operated by a cellular data provider (e.g., multi-access edge compute (MEC) systems), distributed computing systems operated by a cloud-computing provider (e.g., multi-access cloud compute systems), or by other such distributed computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with 3D modeling of an object by merging voxelized representations of the object in accordance with methods and systems described herein and/or as may serve a particular implementation.

Figure 2:
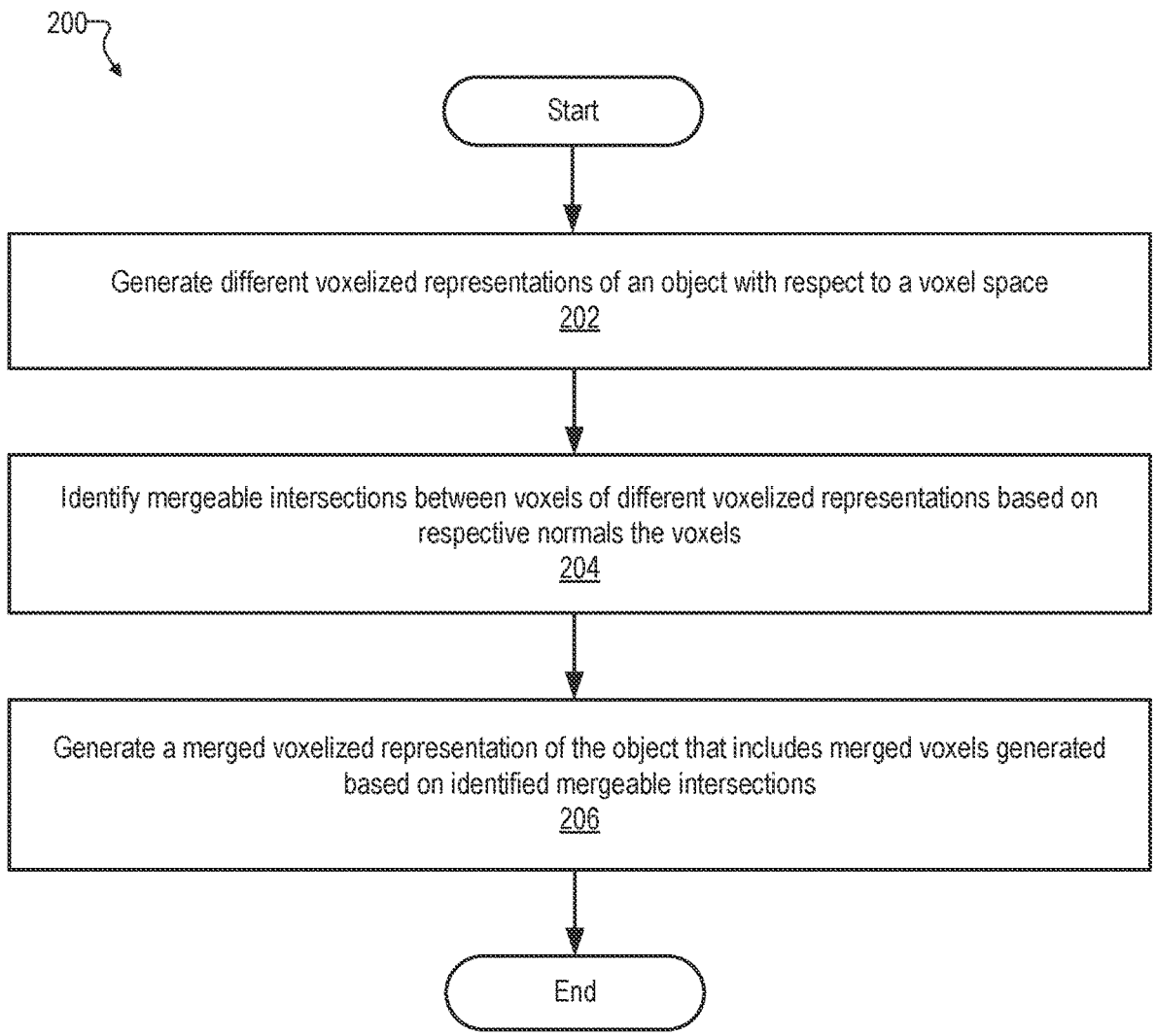
FIG. 2 shows an illustrative method for 3D modeling of an object by merging voxelized representations of the object according to embodiments described herein.

As one example of functionality that processor 104 may perform, FIG. 2 shows an illustrative method 200 for 3D modeling of an object by merging voxelized representations of the object in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a 3D modeling system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may generate different voxelized representations of an object with respect to a voxel space. For example, as will be described in more detail below, depth datasets for an object may be captured from a variety of different viewpoints around the object. Based on a first depth dataset captured from a first viewpoint, system 100 may generate a first voxelized representation of the object with respect to the voxel space. Additionally, based on a second depth dataset captured from a second viewpoint different from the first viewpoint, system 100 may generate a second voxelized representation of the object with respect to the voxel space.

Because the first and second viewpoints are different and each depth dataset represents the object from only the perspective of a single viewpoint (e.g., so as to represent only certain surfaces of the object and not all the surfaces on all the sides of the object), the first and second depth datasets may include some overlapping or redundant information about the object's surfaces, as well as some unique (non-overlapping) information that the other depth dataset does not represent. Consequently, when system 100 generates the first and second voxelized representations of the object with respect to the same voxel space (e.g., the same 3D coordinate system in which the voxels are represented) at operation 202, certain voxels may be unique to only one of the first and second voxelized representations (i.e., thereby adding information about the object for a final 3D model that is to be generated of the entire object) while other voxels may represent redundant or intersecting information incorporated by both the first and second voxelized representations.

At operation 204, system 100 may identify one or more mergeable intersections between voxels of different voxelized representations. For example, referring specifically to the first and second voxelized representations described above, system 100 may identify a mergeable intersection between a first voxel included in the first voxelized representation and a second voxel included in the second voxelized representation. As will be described and illustrated in more detail below, a mergeable intersection between voxels included in different voxelized representations may be identified when the voxels include redundant information about an identical surface point (e.g., a truly identical surface point or a surface point close enough to be functionally identical) on the object. For example, a particular surface point on a surface of an object may be represented in depth data captured from several different viewpoints including, for instance, the first and second viewpoints described above. In this example, both the first and second depth datasets, as well as the first and second voxelized representations generated based on those depth datasets, will each include information about this particular surface point. A mergeable intersection between voxels thus occurs when two or more different voxels included in two or more different voxelized representations are determined to actually refer to the same surface point on the object such that only one of these voxels is needed to model the object (while the other voxel or voxels are redundant).

Mergeable intersections between voxels from different voxelized representations generated based on depth datasets from different viewpoints may be identified in any way and based on any suitable criteria. As one example, which will be further described and illustrated below, a mergeable intersection between a first voxel (from the first voxelized representation) and a second voxel (from the second voxelized representation) may be identified based on a first normal of the first voxel and a second normal of the second voxel. The normal (or "surface normal") of a voxel may be stored for the voxel in connection with other properties of the voxel and may indicate the normal of the surface represented by the voxel as the surface is oriented at a given moment in time (e.g., for the moment when the depth datasets are captured and the moment to which the voxelized representations correspond). Voxels from different voxelized representations that are positioned in similar or identical locations within the voxel space and that have similar or identical normals may be identified as being mergeably intersecting with one another. In other words, the determination may be made that both of these voxels are not necessary for the final 3D model, but, rather, that these voxels may be merged (e.g., combined) into a single voxel that can represent the surface point at that location and with that normal by itself.

At operation 206, system 100 may generate a merged voxelized representation of the object with respect to the voxel space. For example, the merged voxelized representation may be generated based on the first and second voxelized representations generated at operation 202. The merged voxelized representation generated at operation 206 may include merged voxels generated based on mergeable intersections identified at operation 204. For instance, referring to the example described above with the mergeable intersection for the first and second voxels from the respective first and second voxelized representations, the merged voxelized representation generated at operation 206 may include a single merged voxel generated, based on the identified mergeable intersection between the first and second voxels, to represent both the first and second voxels. For example, as will be described in more detail below, the single merged voxel may inherit properties (e.g., coordinates, a normal, an intensity value, links to other voxels, etc.) from either or both of the first and second voxels that are merged to form the single merged voxel. In some examples, properties may be averaged or otherwise combined from the first and second voxels to determine the property to be assigned to the merged voxel. In other examples, the properties assigned to the merged voxel may be selected from only one of the first and second voxels or may be derived from combining the properties of the first and second voxels in another suitable way (e.g., summing, concatenating, etc.).

Figure 3:
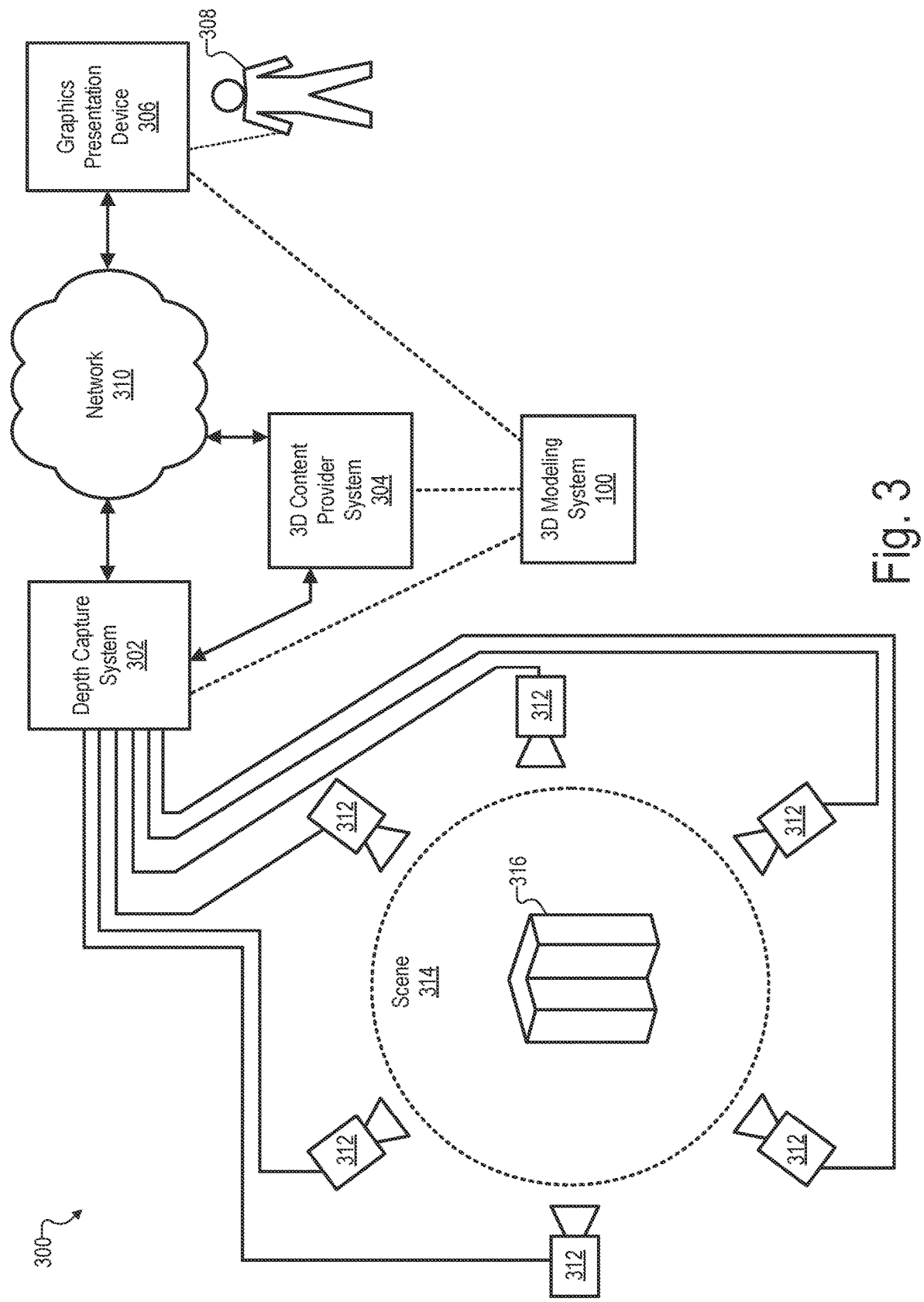
FIG. 3 shows an illustrative configuration in which the 3D modeling system of FIG. 1 may operate according to embodiments described herein.

FIG. 3 shows an illustrative configuration 300 in which system 100 may operate in accordance with principles described herein. Specifically, as illustrated with dotted lines in the example of configuration 300, system 100 may be implemented by a depth capture system 302, a 3D content provider system 304 ("provider system 304"), a graphics presentation device 306 operated by a user 308 (e.g., an end user), or by a combination of one or more of these devices and/or other suitable devices (not explicitly shown in FIG. 3). As shown in FIG. 3, whichever of these devices may implement part of all of system 100 and/or be present in a given configuration, a network 310 may provide a communicative fabric by way of which the various computing devices may intercommunicate and interoperate with one another. As such, each of depth capture system 302, provider system 304, and graphics presentation device 306 are shown to be communicatively coupled to network 310 in configuration 300.

Depth capture system 302 may represent one or more computing devices that receive image data (e.g., color images, depth images, etc.) from a plurality of capture devices 312 arranged with respect to (e.g., at various positions within, around, surrounding, etc.) a scene 314 that includes an object 316. The image data received and processed by depth capture system 302 may include depth datasets that are captured by capture devices 312 and that represent geometric properties of various surfaces of object 316 as detected from the different viewpoints at which capture devices 312 are positioned. For example, certain of capture devices 312 may capture depth datasets representing the front of object 316, other capture devices 312 may capture depth datasets representing the back of object 316, other capture devices 312 may capture depth datasets representing the sides of object 316, and so forth. As shown in configuration 300, capture devices 312 may, in some configurations, be positioned on all sides of scene 314 so as to capture objects within the scene (e.g., object 316) from viewpoints 360° around the objects.

Capture devices 312 may capture depth data and other data representative of objects within scene 314 (e.g., object 316) in any suitable way. For example, capture devices 312 may be implemented by depth capture devices configured to use time-of-flight or other depth capture techniques (e.g., structured light, etc.) to scan objects within scene 314 to thereby generate the depth data representative of those objects. As another example, each capture device 312 may be implemented as a pair of color data capture devices (e.g., video cameras, etc.) that captures stereo images that can be used to derive the depth data. For instance, if extrinsic parameters for each of two stereo capture devices at a single node (e.g., represented by a single capture device 312 illustrated in configuration 300) are known, depth information for various features depicted in imagery captured by the stereo capture devices may be derived based on how these features are depicted in each of the stereo images and based on the known extrinsic parameters. Along with depth data representative of the positions and surface geometries of objects within scene 314 from each viewpoint, capture devices 312 may also provide, to depth capture system 302, intensity data (e.g., color data, grayscale data, etc.) that represents how the objects appear from those same viewpoints.

For clarity of description and illustration, scene 314 is shown in configuration 300 to encompass a circular area that includes a single object 316. It will be understood however, that scene 314 may be any suitable size or shape and may be located indoors, outdoors, or in any other location. It will also be understood that scene 314 may include more than a single object such as is shown in configuration 300. For instance, one implementation of scene 314 could include a field on which a sporting event is taking place (e.g., a football field where a football game is taking place, a basketball court on which a basketball game is taking place, etc.), and which would therefore include a variety of objects such as players, referees, the ball, and so forth. Similarly, while object 316 is depicted as a 3D geometric shape having various surfaces that look different from the variety of different viewpoints at which capture devices 312 are positioned, it will be understood that object 316 may represent any person or other living thing, any inanimate object, any surface (e.g., the ground, a wall, a surface of a body of water, etc.), or other suitable 3D object that may be included within scene 314.

Depth capture system 302 may direct capture devices 312 to synchronously capture a sequence of images (with corresponding depth and/or intensity datasets) of objects within scene 314 such that depth capture system 302 may receive respective frame sequences of intensity and depth frames from each of the viewpoints at which capture devices 312 are positioned. In some examples, depth capture system 302 may process these frame sequences (and/or other data received from capture devices 312) itself, such as by including all or part of an implementation of system 100. In other examples, depth capture system 302 may direct capture devices 312 to capture the depth datasets and assist with collecting, synchronizing, and/or otherwise organizing this data, but may then transmit this data to an implementation of system 100 embodied elsewhere such as on provider system 304 or graphics presentation device 306.

Provider system 304 may include one or more computing devices that receive image data (e.g., depth data, intensity data, etc.) from a device responsible for capturing such data (e.g., depth capture system 302). Based on this data, provider system 304 may generate content that can be provided to graphics presentation device 306 for presentation to user 308. For instance, in an example in which system 100 is implemented within provider system 304, provider system 304 may receive the depth datasets from depth capture system 302, generate suitable 3D representations of object 316 and/or other objects within scene 314, and provide these 3D representations themselves, or prerendered images depicting these 3D representations, to graphics presentation device 306 by way of network 310.

Network 310 may be implemented by any suitable private or public networks as may serve a particular implementation. For instance, part of network 310 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between depth capture system 302, provider system 304, one or more graphics presentation devices 306 (only one of which is explicitly shown in configuration 300), and/or other computing devices connected to the network. Such communications services may include radio spectrum allocation, wireless network infrastructure, back haul infrastructure, provisioning of devices, network repair for network 310, and so forth.

In some examples, other networks not controlled by the provider may also be included within network 310. For example, external network infrastructure may include the Internet, one or more wide area networks or local area networks to which graphics presentation device 306 is connected, a content delivery network, and/or any other suitable network or networks managed by any third parties outside of the control of the provider of the provider system described above. The network elements associated with network 310 may implement or employ any suitable communication technologies, devices, media, protocols, or the like as may serve a particular implementation.

In certain examples, depth capture system 302 and/or provider system 304 may be implemented by multi-access edge compute (MEC) systems, multi-access cloud compute systems, and/or other distributed computing resources as may be implemented within network 310 (or communicatively coupled to network 310) in a particular implementation.

Graphics presentation device 306 may be implemented by a device used by user 308 to view graphics such as a rendering of a 3D model of object 316 and/or other objects included within scene 314. For example, 3D representations (e.g., voxelized representations, textured meshes, etc.) of such objects may be provided to graphics presentation device 306 to allow graphics presentation device 306 to render these representations into an image that can be presented to user 308 (e.g., from an arbitrary viewpoint selected by user 308). As another example, such rendering may be performed by server-side systems (e.g., by an implementation of provider system 304 embodied on a MEC system within network 310) such that graphics presentation device 306 receives 2D graphics information that may be presented directly to user 308 without having to perform the rendering of the 3D representation. To this end, graphics presentation device 306 may be implemented by various types of devices that are capable of displaying graphical imagery to users. For instance, graphics presentation device 306 could be implemented as (or included within) a consumer computing system such as a mobile device (e.g., a smartphone, a tablet computing device, etc.), a dedicated virtual reality or augmented reality presentation device (e.g., a head-mounted device configured to display graphics directly in front of each eye of user 308), a portable or stationary computing device (e.g., a personal desktop or laptop computer, etc.), a television device, or any other system or device as may serve a particular implementation. In some examples, graphics presentation device 306 may include one or more display screens (e.g., traditional display screens, partially transparent heads-up display (HUD) screens, computer monitors, etc.) configured to display frames rendered by graphics presentation device 306 itself or by server-side systems such as depth capture system 302 or provider system 304.

User 308 may represent any person who views graphical representations presented by graphics presentation device 306, and will be understood to typically have at least some degree of control over what graphics presentation device 306 displays. For example, if graphics presentation device 306 is implemented as an augmented or virtual reality presentation device, user 308 may move graphics presentation device 306 with respect to a virtual scene being presented and may, in this way, control the viewpoint from which the virtual or augmented reality experience is provided.

Figure 4:
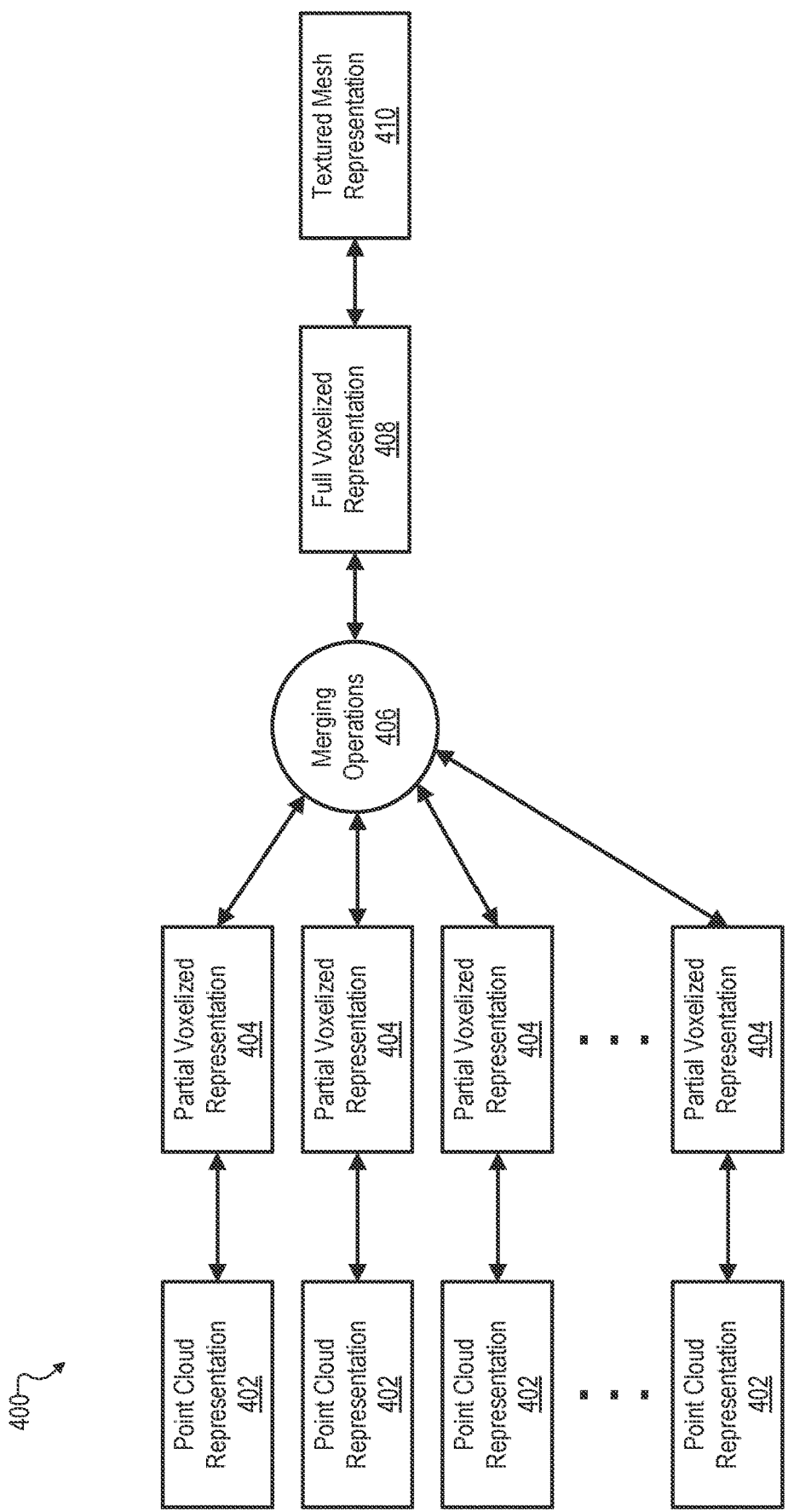
FIG. 4 shows an illustrative dataflow used by the 3D modeling system of FIG. 1 for 3D modeling of an object according to embodiments described herein.

FIG. 4 shows an illustrative dataflow 400 used by system 100 for 3D modeling of an object in accordance with principles described herein. Specifically, as shown, system 100 may generate or receive a plurality of point cloud representations 402 each associated with a different viewpoint with respect to one or more objects such as object 316. From these point cloud representations 402, dataflow 400 shows that various partial voxelized representations 404 may be generated. A merging operation 406 may be performed based on partial voxelized representations 404 to generate a full voxelized representation 408. In some examples, full voxelized representation 408 may then be converted into a textured mesh representation 410 of the object that may be rendered for display, provided to a graphics engine for further manipulation and processing, or otherwise used as may serve a particular implementation.

Figure 5:
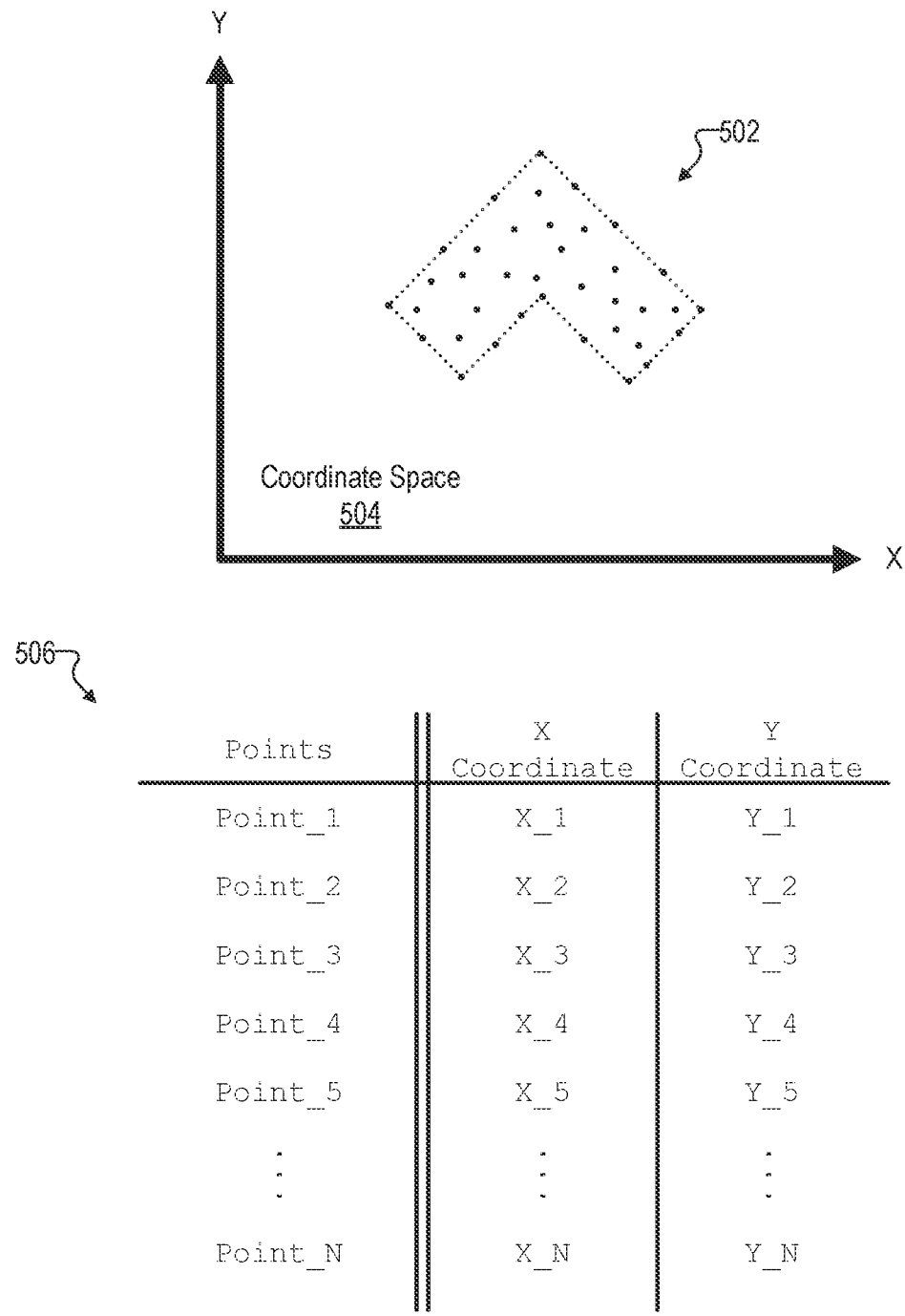
FIG. 5 shows illustrative aspects of a point cloud representation of an object to be modeled by the 3D modeling system of FIG. 1 according to embodiments described herein.
Figure 6:
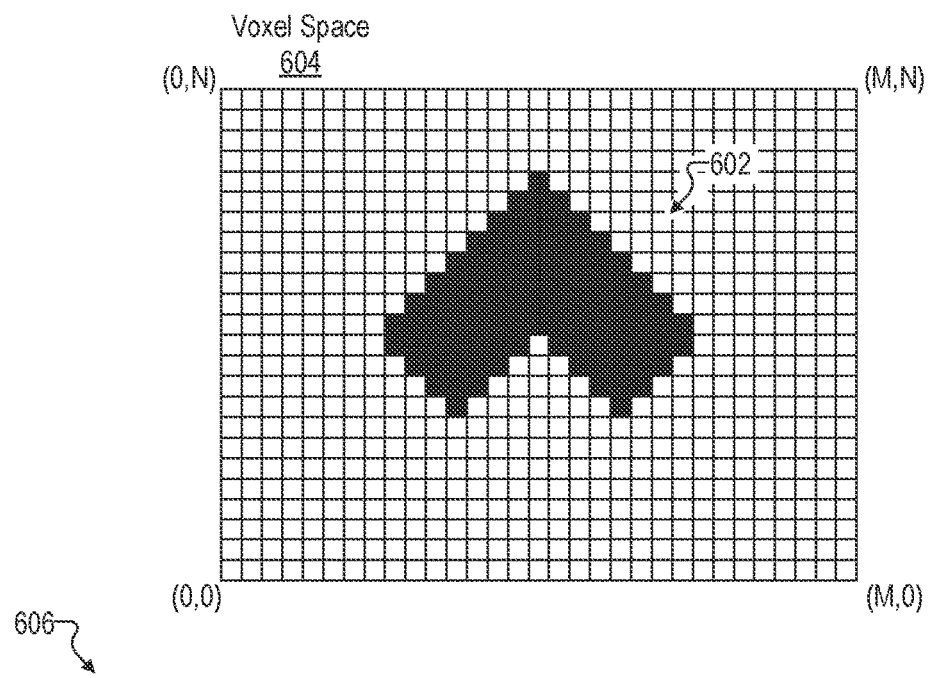
FIG. 6 shows illustrative aspects of a voxelized representation of an object to be modeled by the 3D modeling system of FIG. 1 according to embodiments described herein.
Figure 7:
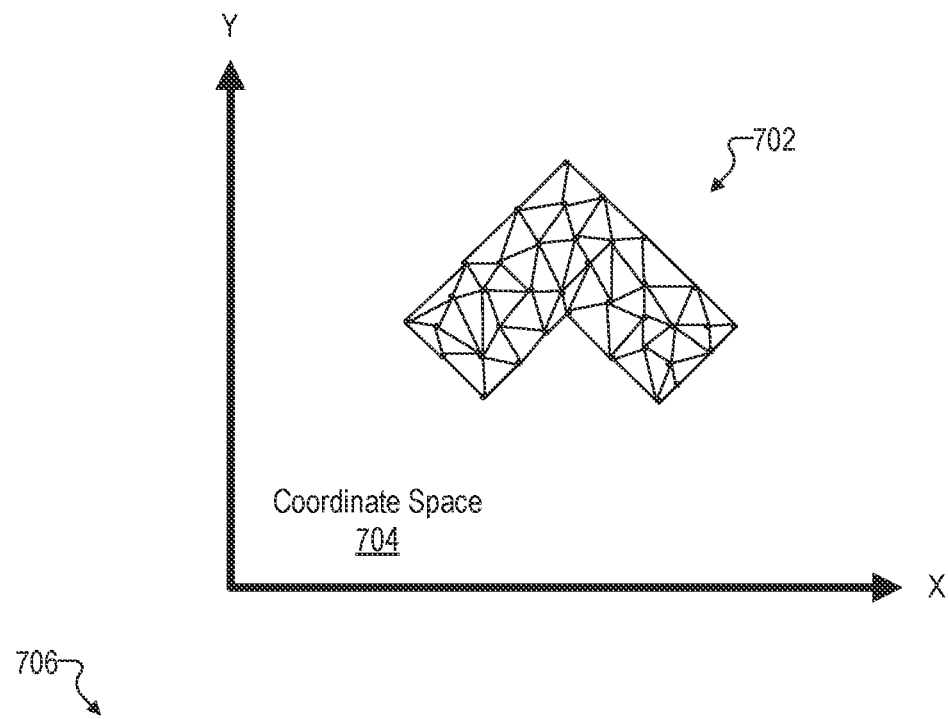
FIG. 7 shows illustrative aspects of a mesh representation of an object to be modeled by the 3D modeling system of FIG. 1 according to embodiments described herein.

Each of the elements of dataflow 400 will be described in detail below. To set the stage for this description, however, FIGS. 5-7 will first be described to set forth certain principles and aspects of the different types of data representations involved in 3D modeling of an object as described herein. Specifically, FIG. 5 shows illustrative aspects of a point cloud representation of an object to be modeled by system 100, FIG. 6 shows illustrative aspects of a voxelized representation of this object, and FIG. 7 shows illustrative aspects of a textured mesh representation of the object. While each of the different types of object representations described in relation to FIGS. 5-7 may be understood to be 3D representations of an object such as object 316 (or any other suitable object such as has been described), FIGS. 5-7 illustrate the representation principles in 2D for clarity of illustration and description.

Beginning with FIG. 5, this figure shows illustrative aspects of a point cloud representation 502 (in this case, a 2D point cloud representation) of an object such as object 316 that is to be modeled by system 100. As shown, point cloud representation 502 includes a plurality of points plotted within a coordinate space 504 (e.g., a 2D coordinate space having an x-axis ("X") and a y-axis ("Y") in this example). As illustrated by the dotted line enclosing all the plotted points of point cloud representation 502, these points make up a 2D geometric object such as a 2D slice of object 316 (e.g., from the top view). While the graph at the top of the figure shows the points of point cloud representation 502 graphically plotted within coordinate space 504, a dataset 506 at the bottom of the figure illustrates an example of the types of data that may be employed to represent point cloud representation 502. Specifically, as shown, each point (e.g., "Point_1," "Point_2," etc.) in a plurality of N points (where N may represent any suitable integer equal to the number of points included in point cloud representation 502) is associated with both a coordinate on the x-axis ("X Coordinate") and a coordinate on the y-axis ("Y Coordinate"). For instance, Point_1 is associated with (x,y) coordinates (X_1, Y_1); Point_2 is associated with (x,y) coordinates (X_2, Y_2); and so forth.

Point cloud representation 502 may be generated based on a depth dataset that is captured from a particular viewpoint of the object. For example, each point represented within point cloud representation 502 may be derived from the types of depth datasets captured by capture devices 312 in the ways described above. While not explicitly shown in FIG. 5, it will be understood that other types of data (e.g., related to intensity, color, texture, etc.) may also be associated with each point in point cloud representation 502. For example, such additional data may also be captured by capture devices 312 in connection with the depth data included in the depth datasets.

FIG. 6 shows illustrative aspects of a voxelized representation 602 (in this case, a 2D voxelized representation) of the same object shown in point cloud representation 502 of FIG. 5. As shown, voxelized representation 602 includes a plurality of active voxels (black boxes) stored within a voxel space 604 that includes the active voxels along with various non-active voxels (white boxes) not used in voxelized representation 602. For the reasons mentioned above, voxel space 604 is shown as a 2D voxel space (e.g., similar to a pixel space) with voxels numbered from 0-M on the horizontal axis and from 0-N on the vertical axis. It will be understood that, for a true 3D voxel space, each voxel may also exist on a third axis orthogonal to the horizontal and vertical axes shown in FIG. 6. As shown, the active voxels of voxelized representation 602 form the same shape as the points of point cloud representation 502 (i.e., the 2D slice of object 316). It will be understood that, while certain implementations of voxel space 604 may include data for each active and non-active voxel as illustrated in FIG. 6, other implementations may include only data for active voxels.

As will be made apparent in light of further description below, one advantage of a voxelized representation of an object or object surface is that each voxel may not only represent a particular location within the voxel space, but may also conveniently store any data associated with that surface point of the object as may serve a particular implementation. For example, along with the locational data inherent to a particular voxel, the data structure representing the voxel may also store information about the visual appearance of the surface point represented by the voxel (e.g., intensity data, color data, texture data, etc.), geometric information defining the voxel (e.g., a surface normal for the surface point represented by the voxel, etc.), relational information defining how the voxel or the surface point it represents relates to other voxels or surface points (e.g., links to other voxels, adjacency information, covariance information, etc.), and/or any other suitable information as may serve a particular implementation.

To illustrate, while voxel space 604 at the top of the figure shows the active voxels of voxelized representation 602 graphically plotted within the space, a dataset 606 at the bottom of the figure illustrates an example of the types of data that may be employed to represent voxelized representation 602. Specifically, as shown, each voxel at each position within voxel space 604 (e.g., "Vox_0_0" for the non-active voxel at (0,0), "Voxel_10_10" for the active voxel at (10,10), etc.) may be associated with color or other intensity information ("Intensity"), surface normal information ("Normal"), one or more links to other voxels ("Links"), and/or any other data as described herein or as may serve a particular implementation ("Other"). For instance, Vox_0_0 (i.e., the non-active voxel at (0,0)) is shown to be associated with null data ("Non-act") indicative of its non-active status; Vox_10_10 (i.e., the active voxel at (10,10)) is shown to be associated with an intensity "Int_10_10," a surface normal "Norm_10_10," a list of links to other voxels "[Links 10_10]" (the square brackets being used herein to denote a list of values rather than a single value), and other information "Other 10_10"; Vox_10_11 is shown to be associated with an intensity "Int_10_11," a surface normal "Norm_10_11," a list of links to other voxels "[Links_10_11]", and other information "Other_10_11"; and so forth.

In some examples, links for each voxel within voxel space 604 may be implemented so as to connect only to adjacent or immediately neighboring voxels. As will be described in more detail below, however, in other examples, the links stored for each voxel within voxelized representation 602 (e.g., with the Links category of dataset 606) may additionally or alternatively include links to non-neighboring and non-adjacent voxels. Such an implementation will be referred to as a linked voxel space and will be understood to be useful at least because of the convenience of converting a voxelized representation in a linked voxel space to a textured mesh such as will be described below. For example, just as with nodes of a mesh that store connection with other nodes, voxels represented within a linked voxel space may store connections with non-neighboring voxels that allow for straightforward conversion to a mesh representation that can be analyzed and processed as a discrete object (e.g., to be moved within a scene, removed from a scene, rotated, scaled, transformed, posed in different ways, duplicated, etc.).

In various voxelized representations described herein (e.g., partial and full voxelized representations illustrated in FIG. 4 and described in more detail below), linked voxel spaces may be employed to allow voxels to maintain information about their connectivity beyond their immediate neighbors in the linked voxel space. As such, when a mesh is converted into a linked voxel space, edges between vertices of the mesh may be converted to links between voxels and each voxel may be represented by a point centered in the voxel. As illustrated by dataset 606, each particular voxel within a linked voxel space may be configured to store, among other information, at least 1) an intensity value representative of an intensity of the particular voxel; 2) a normal value representative of a surface normal of the particular voxel; and 3) a plurality of links to additional voxels non-adjacent to the particular voxel.

FIG. 7 shows illustrative aspects of a mesh representation 702 (in this case, a 2D textured mesh representation) of the same object represented in point cloud representation 502 and voxelized representation 602. As shown, mesh representation 702 includes a plurality of triangles each formed from edges connecting three vertices plotted within a coordinate space 704 (e.g., a 2D coordinate space having an x-axis ("X") and a y-axis ("Y") in this example). While a triangle mesh is shown in FIG. 7, it will be understood that other geometric shapes such as quadrilaterals could be used in addition or as an alternative to the triangles of mesh representation 702. As shown, the vertices of the triangles of mesh representation 702 may correspond to certain of the active voxels of voxelized representation 602 and/or to the points of point cloud representation 502. For example, the triangles may be created by forming connections (the edges of the triangles) between the points in the point cloud representation and/or by linking voxels in an implementation of a voxelized representation within a linked voxel space such as described above.

While the graph at the top of the figure shows the triangles of mesh representation 702 graphically plotted within coordinate space 704, a dataset 706 at the bottom of the figure illustrates an example of the types of data that may be employed to represent mesh representation 702. Specifically, as shown, each triangle (e.g., "Tri_1," "Tri_2," etc.) in a plurality of N triangles forming the mesh (where N may represent any suitable integer equal to the number of triangles included in mesh representation 702) is associated with both a set of vertices ("Vertices" implemented as points on the x-axis and y-axis) and information about the appearance or texture of the inside of the triangle ("Texture"). For instance, Tri_1 is associated with a set of three [Vertices_1] and a texture Text_1; Tri_2 is associated with a set of three [Vertices_2] and a texture Text_2; and so forth.

In some examples, mesh representation 702 may be generated from a point cloud representation or other captured data (e.g., the depth dataset and a corresponding intensity dataset). In these examples, mesh representation 702 may be readily converted into a voxelized representation that is implemented within a linked voxel space as described above. Conversely, a voxelized representation such as voxelized representation 602 may be generated and linked within a linked voxel space and then converted to a textured mesh representation using the links stored in the various voxels.

As has been mentioned, one benefit of a textured mesh representation of an object such as mesh representation 702 is that this representation may be independently processed and manipulated apart from other objects that may also be represented with clouds of points in the same coordinate space or with voxels in the same voxel space. For example, mesh representation 702 may be independently modified or altered, added to a scene, removed from a scene, moved or translated within a scene, reoriented or otherwise transformed within a scene, replicated, scaled, and/or manipulated in any other way as may serve a particular implementation. As mentioned above and as will be described in more detail below, another benefit of representing independently processable models of an object (e.g., such as mesh representation 702) is that the object may be more consistently represented from frame to frame in a frame sequence, resulting in a more stable and less jittery appearance.

Returning to FIG. 4, dataflow 400 is shown to begin with a plurality of point cloud representations 402. For example, these point cloud representations 402 may be generated and provided to system 100 by capture devices 312 (e.g., by way of depth capture system 302). Point cloud representations 402 may be generated based on, or may otherwise incorporate, a plurality of depth datasets captured by capture devices 312 from the various viewpoints of scene 314 shown in FIG. 3. This plurality of depth datasets may include the first and second depth datasets mentioned in relation to FIG. 2 as well as one or more additional depth datasets that are captured from one or more additional viewpoints.

The different point cloud representations 402 shown in FIG. 4 will be understood to represent different partial representations of one or more objects within a scene (e.g., object 316 of scene 314). Specifically, for example, each point cloud representation 402 may represent the one or more objects from a different particular viewpoint such as illustrated by the viewpoints of capture devices 312 in configuration 300. However, in order for the data from point cloud representations 402 to be analyzed and merged to form a single 3D model, the point cloud data from the different viewpoints must be transformed to share a common coordinate space. Accordingly, it will be understood that certain calibration operations may be performed to determine extrinsic parameters for capture devices 312 and to determine transforms whereby data captured from each viewpoint may be globally registered to a common coordinate space or "base" viewpoint (e.g., a coordinate space corresponding to a particular one of capture devices 312).

Once point cloud representations 402 have been globally registered in this way, each point cloud representation 402 may be converted into a mesh representation that represents the object as a discrete partial 3D model while keeping the depth data (e.g., the point cloud data) intact. While this step is not explicitly shown in dataflow 400, converting point cloud representations 402 to mesh representations may be an advantageous way to then generate the plurality of partial voxelized representations 404 that is shown to be derived from point cloud representations 402 in dataflow 400. For example, the depth datapoints represented in each point cloud representation 402 may be connected with edges to form the mesh triangles (such as described above in relation to FIG. 7), and then this partial mesh may be readily converted into a partial voxelized representation within a linked voxel space that creates links between non-adjacent voxels for the different edges between the vertices.

Whether by way of point cloud representations 402, intermediate mesh representations, or a combination of both of these and/or other intermediate processing, voxelized representations of object 316 may be generated based on the depth datasets captured from the different viewpoints of capture devices 312. More particularly, the first and second voxelized representations of object 316 and each of the one or more additional voxelized representations of object 316 mentioned above may be implemented as partial voxelized representations 404. Partial voxelized representations will be understood to refer to voxelized representations that are limited to different portions of an object less than an entirety the object. As such, partial voxelized representations 404 may each be associated with one of the viewpoints of capture devices 312 (since these are each derived from different depth datasets captured from those viewpoints) and may be limited to the corresponding portions of object 316 visible from those viewpoints (each portion of object 316 being less than an entirety of object 316). While each individual partial voxelized representation 404 only covers a portion of object 316, however, it will be understood that, collectively, partial voxelized representations 404 include information about the entirety of object 316.

To this end, merging operation 406 may be configured to generate a merged voxelized representation as a full voxelized representation of the entirety of object 316. Specifically, as shown, merging operation 406 may output full voxelized representation 408 based on data from the various partial voxelized representations 404 (including the first and second voxelized representation as well as the one or more additional voxelized representations mentioned above). Merging operations 406 may involve at least two major tasks to ultimately merge partial voxelized representations 404 to generate full voxelized representation 408. First, merging operations 406 may involve identifying mergeable intersections between different voxels represented in the different partial voxelized representations 404. Second, merging operations 406 may involve operations to actually merge sets of two or more voxels identified to mergeable intersect into single merged voxels to be ultimately included in full voxelized representation 408. One example of how mergeable intersections are detected will now be described in relation to FIG. 8, and an example of how two intersecting voxels may be merged will then be described in relation to FIG. 9.

Figure 8:
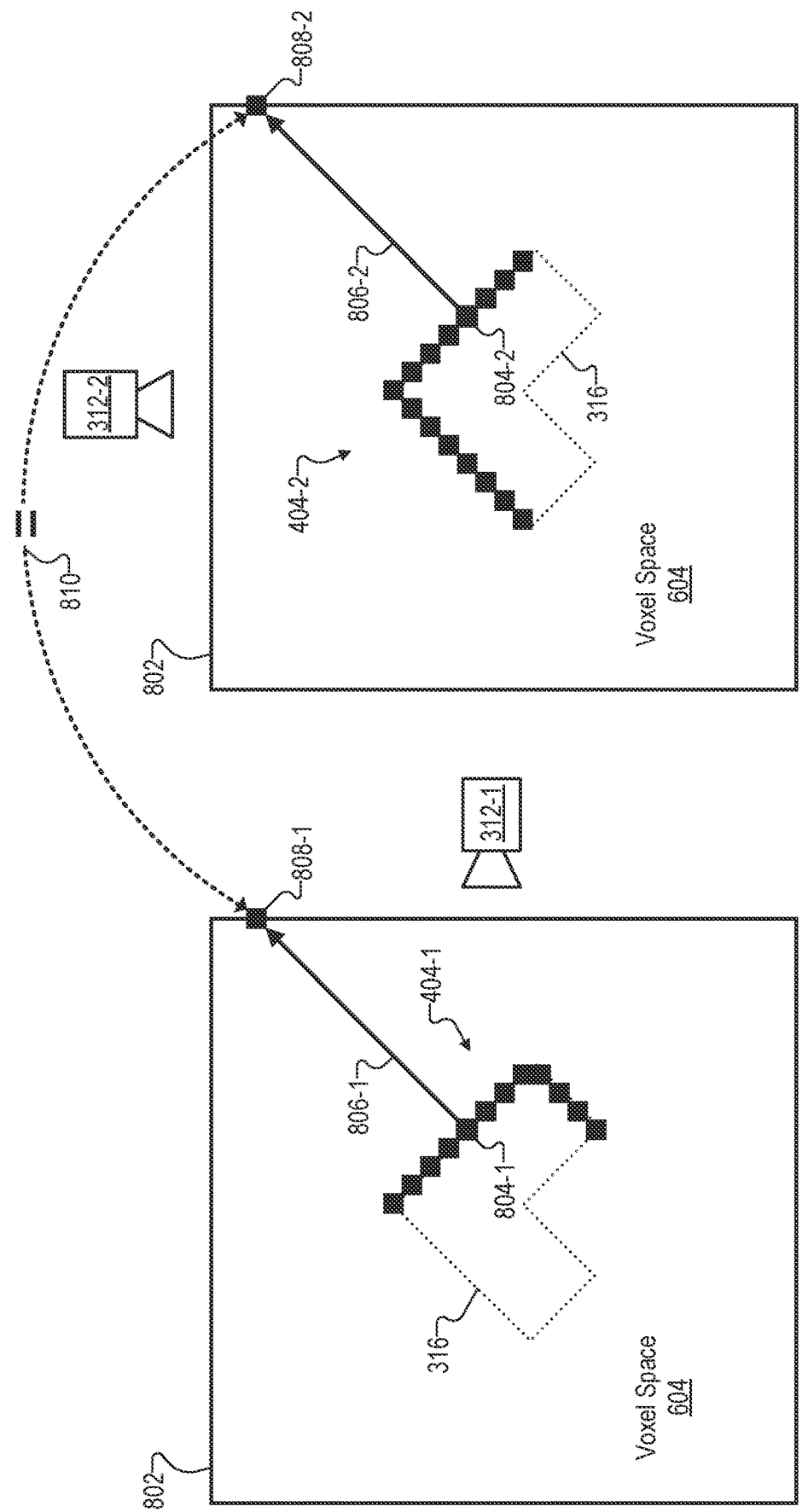
FIG. 8 shows illustrative aspects of how the 3D modeling system of FIG. 1 may detect a mergeable intersection between voxels of different partial voxelized representations according to embodiments described herein.

FIG. 8 shows illustrative aspects of how system 100 may detect a mergeable intersection between voxels from different partial voxelized representations 404 in accordance with principles described herein. More particularly, FIG. 8 shows how system 100 may identify the mergeable intersection between a first voxel with a first normal and a second voxel with a second normal by performing operations including: 1) virtually projecting, based on the first normal, the first voxel onto a virtual cube encompassing the voxel space; 2) virtually projecting, based on the second normal, the second voxel onto the virtual cube; and 3) determining, based on the virtual projecting of the first and second voxels onto the virtual cube, that both the first and second voxels are projected to a same point on the virtual cube.

As shown in FIG. 8, a virtual cube 802 is drawn around voxel space 604, the common voxel space within which each of the partial voxelized representations 404 are represented. As with various types of representations described above in relation to FIGS. 5-7, FIG. 8 illustrates principles in 2D that will be understood to be implemented, in at least certain embodiments, with 3D objects and 3D representations of those objects.

On the left side of FIG. 8, a first partial voxelized representation 404-1 is shown to be represented within voxel space 604. As indicated by a capture device 312-1 on the right side of voxel space 604, first partial voxelized representation 404-1 will be understood to represent surfaces visible to the capture device from one side of object 316. To illustrate, a dotted line indicates an outline of the entirety of object 316 while detected voxels (block boxes) are shown only along the portion of object 316 visible from the viewpoint of capture device 312-1. Similarly, on the right side of FIG. 8, a second partial voxelized representation 404-2 is shown to be represented within the same voxel space 604. As indicated by a capture device 312-2 above voxel space 604, second partial voxelized representation 404-2 will be understood to represent surfaces of object 316 visible from a viewpoint of object 316 that is different from, but overlapping with, the side covered by first partial voxelized representation 404-1. In this example, a dotted line again indicates the outline of the entirety of object 316 and the detected voxels are again shown only along the portion of object 316 that is visible from the viewpoint of capture device 312-2.

It is noted that FIG. 8 shows that voxels have been detected only along outer surfaces of object 316 (the 2D version of object 316 illustrated in this 2D illustration). Accordingly, unlike voxelized representation 602 described above in relation to FIG. 6, it will be understood that the full voxelized representation generated from these types of partial voxelized representations will represent a hollow shell of object 316, rather than a solid object (since capture devices 312 are only able to detect data relating to visible outer surfaces of object 316). It will be understood that the final full voxelized representation 408 may therefore be represented as a hollow shell object or may be filled in to form a solid object as may serve a particular implementation.

To illustrate one particular mergeable intersection detected to be present between partial voxelized representations 404-1 and 404-2, a particular voxel 804-1 labeled on first partial voxelized representation 404-1 will be understood to mergeably intersect with a particular voxel 804-2 labeled on second partial voxelized representation 404-2. To determine this, respective normals 806-1 and 806-2 are shown to be projected from voxels 804 onto the virtual cube 802. It will be understood that virtual cube 802 may be implemented as any shape that suitably encompasses voxel space 604. For example, while virtual cube 802 may be implemented as an actual 3D cube in certain implementations, rectangular prisms encompassing a voxel space or other suitable shapes (e.g., spheres, other types of prisms, etc.) may implement virtual cube 802 in other examples.

Normal 806-1 from voxel 804-1 is shown to be projected to a point 808-1 on virtual cube 802, while normal 806-2 from voxel 804-2 is shown to be projected to a point 808-2 on virtual cube 802. As illustrated by callout 810, after performing the normal projections and identifying points 808-1 and 808-2, system 100 may determine that points 808-1 and 808-2 are a same point (e.g., or within a threshold that allows them to be treated as the same point for practical purposes). Based on this determination that normal 806-1 and normal 806-2 project to the same point on virtual cube 802, system 100 may identify that a mergeable intersection exists between voxel 804-1 of first partial voxelized representation 404-1 and voxel 804-2 of second partial voxelized representation 404-2. Accordingly, system 100 may perform additional operations (e.g., merging operations 406) to merge voxels 804-1 and 804-2 based on this identification of the mergeable intersection.

Figure 9:
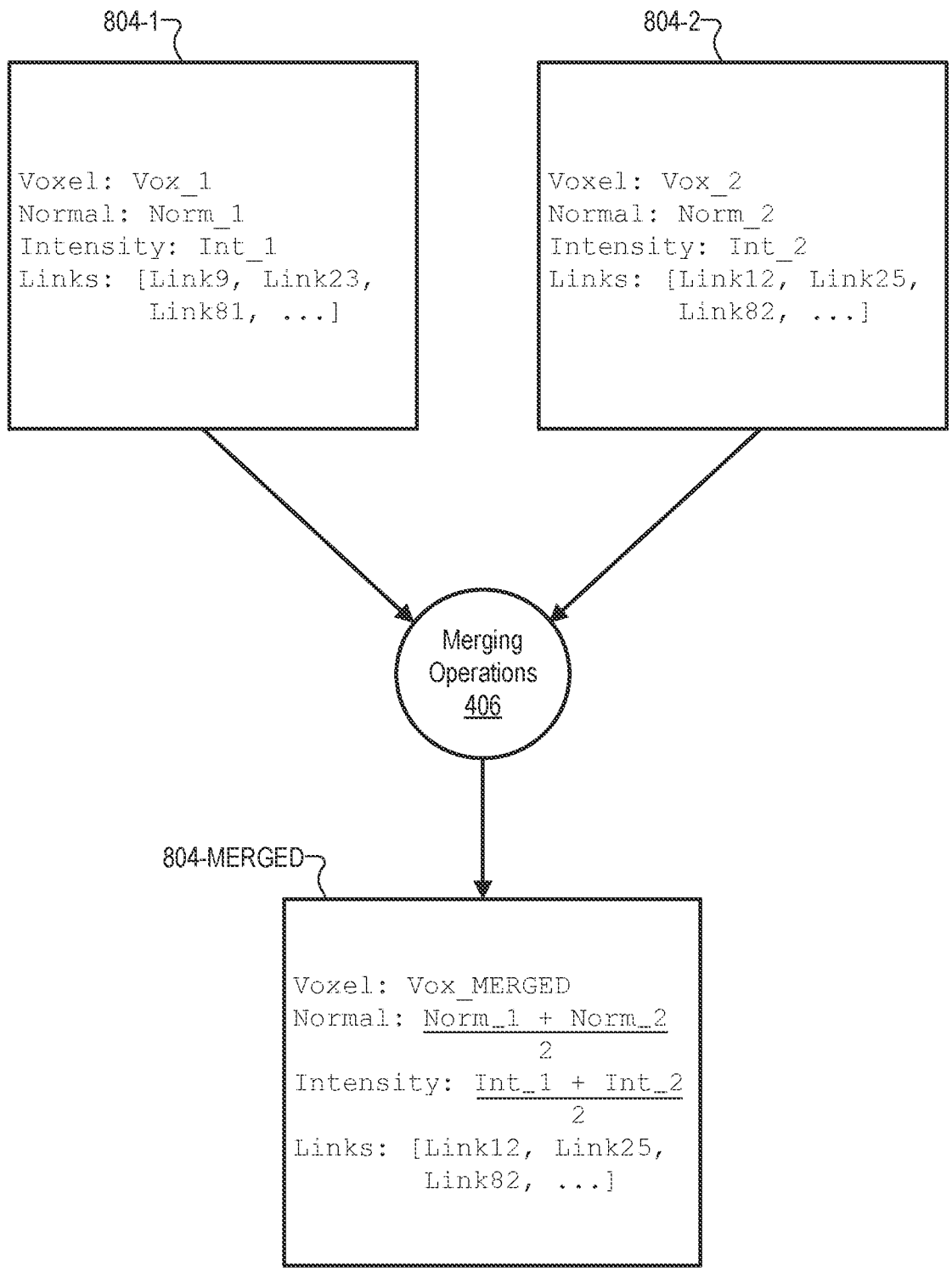
FIG. 9 shows illustrative aspects of how the 3D modeling system of FIG. 1 may perform a merging operation on two voxels identified to mergeably intersect according to embodiments described herein.

To illustrate, FIG. 9 shows certain aspects of how system 100 may, after identifying that voxels 804-1 and 804-2 mergeably intersect, continue with merging operations 406 to generate a single merged voxel 804-MERGED based on voxels 804-1 and 804-2. While a few voxel properties and ways of merging them are shown in FIG. 9, it will be understood that voxels properties may be merged in any suitable manner as may serve a particular implementation. Additionally, while this example of merging operations 406 illustrates the combining of only two voxels to form a new merged voxel, it will be understood that similar principles may be implemented to merge more than two voxels from more than two partial voxelized representations into a merged voxel for use within a full voxelized representation.

Each voxel 804 represented in FIG. 9 (i.e., voxels 804-1, 804-2, and 804-MERGED) is illustrated as a text box indicating certain voxel properties such as an identity property for the voxel ("Voxel:"), a normal property ("Normal:"), an intensity property ("Intensity:"), and a list of links to other voxels ("Links:"). It will be understood that each of the tags indicated after these labels serves as a placeholder for any suitable values that the properties may take. Additional voxel properties such as those described above may also be accounted for as will be described. Various examples of how system 100 may merge individual voxel properties in a particular example will now be described.

First, as shown by the normal property for each of voxels 804, the generating of the merged voxelized representation (e.g., full voxelized representation 408) may include, as part of generating single merged voxel 804-MERGED to represent both voxels 804-1 and 804-2, setting a normal value representative of a normal of single merged voxel 804-MERGED to a mean average of: 1) a first normal value ("Norm_1") representative of first normal 806-1 of voxel 804-1, and a second normal value ("Norm_2") representative of second normal 806-2 of voxel 804-2. This mean average is shown to be computed, in single merged voxel 804-MERGED, by dividing the sum of Norm_1 and Norm_2 by two (since there are two voxels being merged).

Second, as shown by the intensity property for each of voxels 804, the generating of the merged voxelized representation may include, as part of generating single merged voxel 804-MERGED to represent both voxels 804-1 and 804-2, setting an intensity value representative of an intensity of single merged voxel 804-MERGED to a mean average of: 1) a first intensity value ("Int_1") representative of the intensity of voxel 804-1, and a second intensity value ("Int_2") representative of the intensity of voxel 804-2. Similar to the mean average of the normal property, this mean average is shown to be computed, in single merged voxel 804-MERGED, by dividing the sum of Int_1 and Int_2 by two (since there are two voxels being merged).

Third, as shown by the respective lists of links for each of voxels 804, the generating of the merged voxelized representation may include, as part of generating single merged voxel 804-MERGED to represent both voxels 804-1 and 804-2, properly linking and unlinking single merged voxel 804-MERGED with non-adjacent voxels that were linked to voxels 804-1 and/or 804-2. For example, system 100 may select one of voxels 804-1 or 804-2 to pass on its links to single merged voxel 804-MERGED and while unlinking the other (non-selected) voxel. This selection may be performed randomly or based on any suitable criteria as may serve a particular implementation. For instance, in certain implementations, the voxel having the lower covariance (or lowest covariance in a case where more than two voxels are being merged) may be selected to maintain its links while the other voxel (or plurality of voxels for cases involving more than two voxels being merged) having the higher covariance may be completely unlinked from the voxel space.

Specifically, for instance, system 100 may remove, from a plurality of links stored for a non-selected one of voxels 804-1 or 804-2, one or more links to additional voxels non-adjacent to the non-selected one of voxels 804-1 or 804-2. Additionally, to unlink the non-selected voxel in both directions, system 100 may further remove, from the additional voxels non-adjacent to the non-selected one of voxels 804-1 or 804-2, one or more links to the non-selected one of voxels 804-1 or 804-2. Along with this unlinking, system 100 may also update the links for single merged voxel 804-MERGED to include the links of the selected one of voxels 804-1 or 804-2. Specifically, for instance, system 100 may store, for single merged voxel 804-MERGED, a plurality of links to additional voxels non-adjacent to the single merged voxel and that have been stored for the selected voxel (i.e., the selected one of voxels 804-1 or 804-2) and, to ensure the linking goes both ways, store, for the additional voxels non-adjacent to single merged voxel 804-MERGED, a plurality of links to single merged voxel 804-MERGED.

To illustrate, voxel 804-2 may be identified as the voxel with the lower covariance of voxels 804-1 and 804-2 in the example of FIG. 9. As such, single merged voxel 804-MERGED is shown to include the same links as voxel 804-2 ("[Link12, Link25, Link82, . . . ]") while voxel 804-1 is unlinked from the voxel space and its links ("[Link9, Link23, Link81, . . . ]") are not carried on to voxel 804-MERGED.

The examples of voxels 804 described in relation to FIGS. 8 and 9 involve the identification of a single mergeable intersection and the merging of two voxels to form a single merged voxel. It will be understood that the same or a similar process may be performed a large number of times as part of merging operations 406 to identify all the mergeable intersections of voxels in partial voxelized representations 404 and to merge all the redundancies so as to ultimately generate a single merged voxelized representation (i.e., full voxelized representation 408).

Returning to FIG. 4, dataflow 400 shows that full voxelized representation 408 may be used as a basis to generate textured mesh representation 410, which, like full voxelized representation 408, may represent the 3D object in its entirety (i.e., as a full textured mesh representation). More particularly, subsequent to generating full voxelized representation 408 of the entirety of the object, system 100 may further generate, based on full voxelized representation 408, textured mesh representation 410 of the object. System 100 also may provide at least one of full voxelized representation 408 or textured mesh representation 410 of object 316 to graphics presentation device 306 to allow graphics presentation device 306 to present object 316 to user 308.

As mentioned above, full voxelized representation 408 may be readily convertible to textured mesh representation 410 due to the linked voxel space used to store full voxelized representation 408 and as a result of the links to non-adjacent voxels stored for each voxel. Specifically, the linked voxels may serve as vertices for the mesh representation while the links themselves may be implemented as edges between the vertices. While either or both of full voxelized representation 408 and textured mesh representation 410 of the object may be provided to graphics presentation device 306 in various implementations, one advantage of being able to provide textured mesh representation 410 involves the perceived continuity of the model, as mentioned above.

More specifically, for an implementation in which each of the plurality of depth datasets are captured synchronously to be associated with a first frame of a frame sequence and full voxelized representation 408 and textured mesh representation 410 of the object are also associated with the first frame of the frame sequence, system 100 may further generate, based on textured mesh representation 410, a low-jitter additional textured mesh representation of the object to be associated with a second frame of the frame sequence (e.g., a frame subsequent to the first frame in the sequence). In this way, rather than the object appearing to be glitchy or jittery when presented (e.g., due to errors in the global registration or other capture artifacts), object 316 may be presented in a highly continuous and smooth way from frame to frame.

Figure 10:
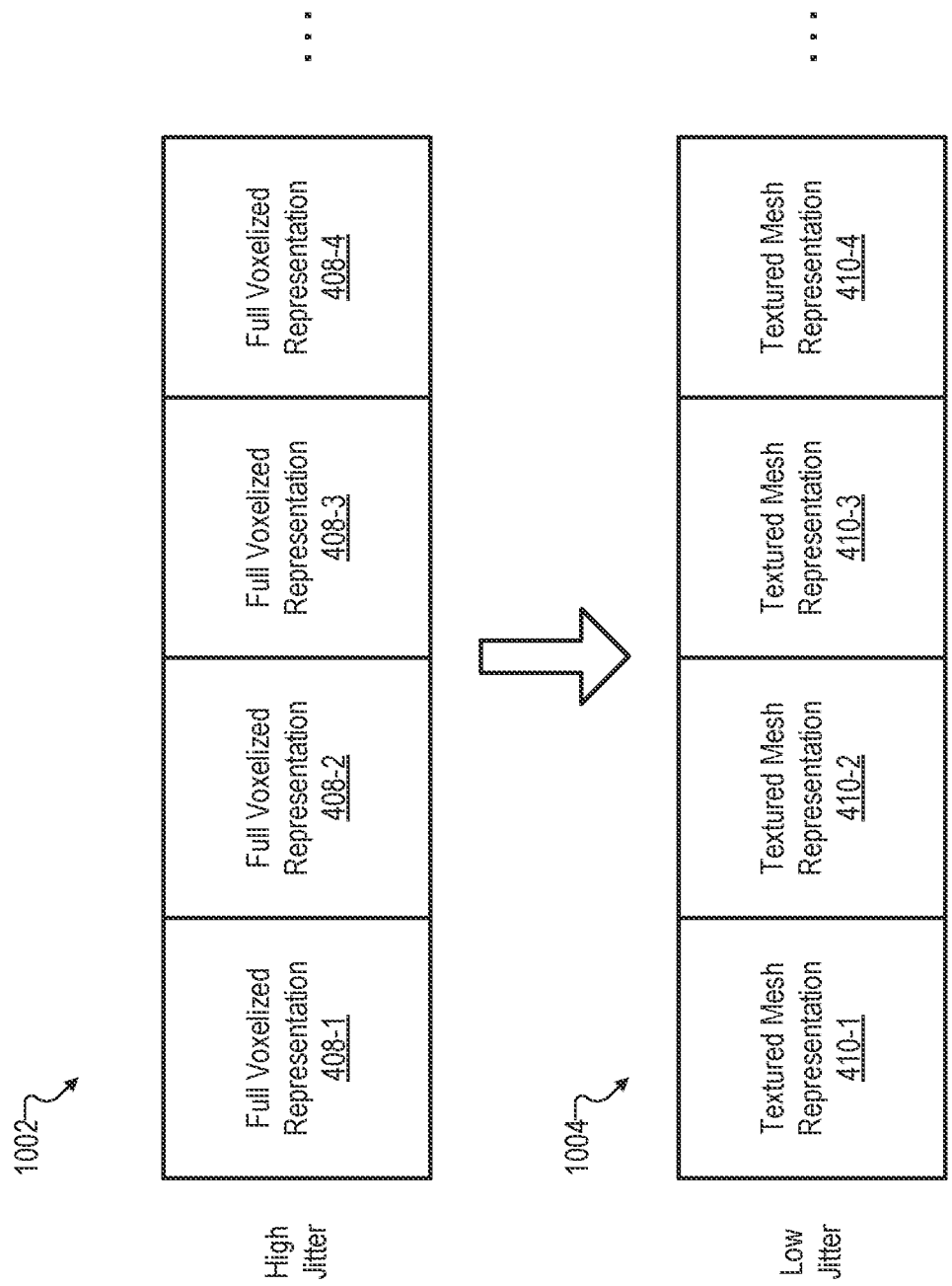
FIG. 10 shows illustrative frame sequences for different types of 3D representations that may be generated for an object according to embodiments described herein.

To illustrate, FIG. 10 shows illustrative frame sequences for different types of 3D representations that may be generated for an object such as object 316. Specifically, as shown, a first frame sequence 1002 may be implemented by individual full voxelized representations 408 (e.g., full voxelized representations 408-1, 408-2, 408-3, etc.) in each frame. A second frame sequence 1004 may be implemented by corresponding textured mesh representations 410 (e.g., textured mesh representations 410-1, 410-2, 410-3, etc.). While each textured mesh representation 410 may be generated based on the corresponding full voxelized representation 408 to update the object in accordance with how object 316 is actually behaving, each textured mesh representation 410 may also account for the previous textured mesh representations 410 of the object. In this way, while frame sequence 1002 is indicated as potentially having relatively high jitter, frame sequence 1004 may have the advantage of maintaining relatively low jitter from frame to frame, which may ultimately make the presentation of object 316 more realistic, immersive, and high quality for user 308.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
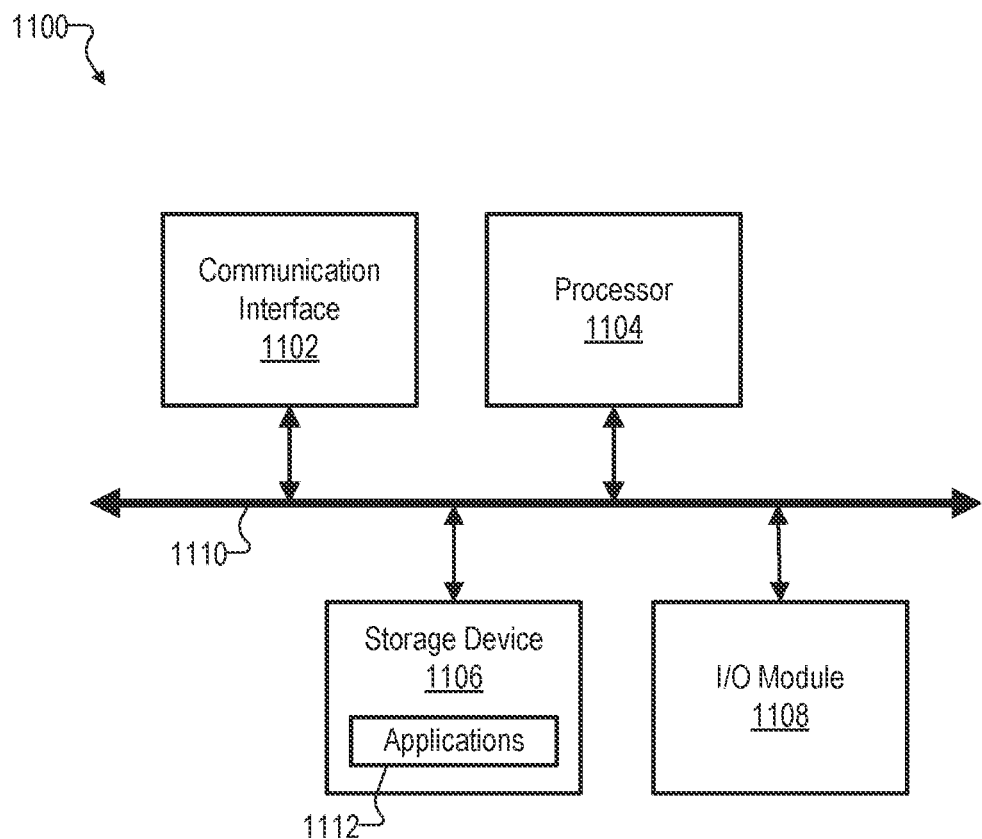
FIG. 11 shows an illustrative computing device that may implement 3D modeling systems and/or other systems and devices described herein.

FIG. 11 shows an illustrative computing device 1100 that may implement 3D modeling systems and/or other systems and devices described herein in accordance with principles described herein. For example, computing device 1100 may include or implement (or partially implement) a 3D modeling system such as system 100 or any component included therein or system or device associated therewith (e.g., depth capture system 302, provider system 304, graphics presentation device 306, computing devices implementing network 310, capture devices 312, etc.).

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
generating, by a 3D modeling system and based on a first depth dataset that is captured at a particular moment in time by a first capture device having a first viewpoint, a first voxelized representation of an object with respect to a voxel space;
generating, by the 3D modeling system and based on a second depth dataset that is captured synchronously with the first depth dataset at the particular moment in time by a second capture device having a second viewpoint different from the first viewpoint, a second voxelized representation of the object with respect to the voxel space;

identifying, by the 3D modeling system and based on a first normal of a first voxel included in the first voxelized representation and a second normal of a second voxel included in the second voxelized representation, a mergeable intersection between the first and second voxels, the mergeable intersection corresponding to a surface point on the object for which the first and second voxels include redundant information for the particular moment in time; and generating, by the 3D modeling system and based on the first and second voxelized representations, a merged voxelized representation of the object with respect to the voxel space and for the particular moment in time, the merged voxelized representation including a single merged voxel generated, based on the identified mergeable intersection, to represent both the first and second voxels at the particular moment in time.

2. The method of claim 1, wherein:

the first and second depth datasets are included in a plurality of depth datasets that further includes one or more additional depth datasets that are captured at the particular moment in time by one or more additional capture devices having one or more additional viewpoints and that the 3D modeling system uses as a basis for generating one or more additional voxelized representations of the object with respect to the voxel space;

each of the first and second voxelized representations of the object and each of the one or more additional voxelized representations of the object are partial voxelized representations limited to different portions of the object less than an entirety of the object; and the generating of the merged voxelized representation of the object is further based on the one or more additional voxelized representations to generate the merged voxelized representation as a full voxelized representation of the entirety of the object at the particular moment in time.

3. The method of claim 2, further comprising:

generating, by the 3D modeling system and based on the full voxelized representation of the entirety of the object, a textured mesh representation of the object; and providing, by the 3D modeling system to a graphics presentation device, at least one of the full voxelized representation or the textured mesh representation of the object to allow the graphics presentation device to present the object to a user of the graphics presentation device.

4. The method of claim 1, wherein:

the merged voxelized representation of the object is a full voxelized representation of an entirety of the object;

a plurality of depth datasets are captured synchronously to be associated with a first frame of a frame sequence, the first frame associated with the particular moment in time;

the full voxelized representation and a textured mesh representation of the object based on the full voxelized representation are associated with the first frame of the frame sequence; and the method further comprises generating, by the 3D modeling system and based on the textured mesh representation, a low-jitter additional textured mesh representation of the object, the low-jitter additional textured mesh representation associated with a second frame of the frame sequence, the second frame subsequent to the first frame and associated with a moment in time subsequent to the particular moment in time.

5. The method of claim 1, wherein the identifying of the mergeable intersection between the first and second voxels includes:

virtually projecting, based on the first normal, the first voxel onto a virtual cube encompassing the voxel space;

virtually projecting, based on the second normal, the second voxel onto the virtual cube; and determining, based on the virtual projecting of the first and second voxels onto the virtual cube, that both the first and second voxels are projected to a same point on the virtual cube.

6. The method of claim 1, wherein the voxel space with respect to which the first and second voxelized representations are generated is a linked voxel space in which each particular voxel is configured to store:

an intensity value representative of an intensity of the particular voxel;

a normal value representative of a normal of the particular voxel, and a plurality of links to additional voxels non-adjacent to the particular voxel.

7. The method of claim 6, wherein the generating of the merged voxelized representation includes, as part of generating the single merged voxel to represent both the first and second voxels, setting a normal value representative of a normal of the single merged voxel to a mean average of:

a first normal value representative of the first normal of the first voxel; and a second normal value representative of the second normal of the second voxel.

8. The method of claim 6, wherein the generating of the merged voxelized representation includes, as part of generating the single merged voxel to represent both the first and second voxels, setting an intensity value representative of an intensity of the single merged voxel to a mean average of:

a first intensity value representative of an intensity of the first voxel; and a second intensity value representative of an intensity of the second voxel.

9. The method of claim 6, wherein the generating of the merged voxelized representation includes, as part of generating the single merged voxel to represent both the first and second voxels:

removing, from a plurality of links stored for a non-selected one of the first or second voxels, one or more links to additional voxels non-adjacent to the non-selected one of the first or second voxels; and removing, from the additional voxels non-adjacent to the non-selected one of the first or second voxels, one or more links to the non-selected one of the first or second voxels.

10. The method of claim 6, wherein the generating of the merged voxelized representation includes, as part of generating the single merged voxel to represent both the first and second voxels:

storing, for the single merged voxel, a plurality of links to additional voxels non-adjacent to the single merged voxel and that have been stored for at least one of the first or second voxels; and storing, for the additional voxels non-adjacent to the single merged voxel, a plurality of links to the single merged voxel.

11. A system comprising:

a memory storing instructions; and a processor communicatively coupled to the memory and configured to execute the instructions to:

generate, based on a first depth dataset that is captured at a particular moment in time by a first capture device having a first viewpoint, a first voxelized representation of an object with respect to a voxel space;

generate, based on a second depth dataset that is captured synchronously with the first depth dataset at the particular moment in time by a second capture device having a second viewpoint different from the first viewpoint, a second voxelized representation of the object with respect to the voxel space;

identify, based on a first normal of a first voxel included in the first voxelized representation and a second normal of a second voxel included in the second voxelized representation, a mergeable intersection between the first and second voxels, the mergeable intersection corresponding to a surface point on the object for which the first and second voxels include redundant information for the particular moment in time; and generate, based on the first and second voxelized representations, a merged voxelized representation of the object with respect to the voxel space and for the particular moment in time, the merged voxelized representation including a single merged voxel generated, based on the identified mergeable intersection, to represent both the first and second voxels at the particular moment in time.

12. The system of claim 11, wherein:

the first and second depth datasets are included in a plurality of depth datasets that further includes one or more additional depth datasets that are captured at the particular moment in time by one or more additional capture devices having one or more additional viewpoints and that the processor uses as a basis for generating one or more additional voxelized representations of the object with respect to the voxel space;

each of the first and second voxelized representations of the object and each of the one or more additional voxelized representations of the object are partial voxelized representations limited to different portions of the object less than an entirety of the object; and the generating of the merged voxelized representation of the object is further based on the one or more additional voxelized representations to generate the merged voxelized representation as a full voxelized representation of the entirety of the object at the particular moment in time.

13. The system of claim 12, wherein the processor is further configured to execute the instructions to:

generate, based on the full voxelized representation of the entirety of the object, a textured mesh representation of the object; and provide, to a graphics presentation device, at least one of the full voxelized representation or the textured mesh representation of the object to allow the graphics presentation device to present the object to a user of the graphics presentation device.

14. The system of claim 11, wherein:

the merged voxelized representation of the object is a full voxelized representation of an entirety of the object;

a plurality of depth datasets are captured synchronously to be associated with a first frame of a frame sequence, the first frame associated with the particular moment in time;

the full voxelized representation and a textured mesh representation of the object based on the full voxelized representation are associated with the first frame of the frame sequence; and the processor is further configured to execute the instructions to generate, based on the textured mesh representation, a low-jitter additional textured mesh representation of the object, the low-jitter additional textured mesh representation associated with a second frame of the frame sequence, the second frame subsequent to the first frame and associated with a moment in time subsequent to the particular moment in time.

15. The system of claim 11, wherein the identifying of the mergeable intersection between the first and second voxels includes:

virtually projecting, based on the first normal, the first voxel onto a virtual cube encompassing the voxel space;

virtually projecting, based on the second normal, the second voxel onto the virtual cube; and determining, based on the virtual projecting of the first and second voxels onto the virtual cube, that both the first and second voxels are projected to a same point on the virtual cube.

16. The system of claim 11, wherein the voxel space with respect to which the first and second voxelized representations are generated is a linked voxel space in which each particular voxel is configured to store:

an intensity value representative of an intensity of the particular voxel;

a normal value representative of a normal of the particular voxel, and a plurality of links to additional voxels non-adjacent to the particular voxel.

17. The system of claim 16, wherein the generating of the merged voxelized representation includes, as part of generating the single merged voxel to represent both the first and second voxels, setting a normal value representative of a normal of the single merged voxel to a mean average of:

a first normal value representative of the first normal of the first voxel; and a second normal value representative of the second normal of the second voxel.

18. The system of claim 16, wherein the generating of the merged voxelized representation includes, as part of generating the single merged voxel to represent both the first and second voxels, setting an intensity value representative of an intensity of the single merged voxel to a mean average of:

a first intensity value representative of an intensity of the first voxel; and a second intensity value representative of an intensity of the second voxel.

19. The system of claim 16, wherein the generating of the merged voxelized representation includes, as part of generating the single merged voxel to represent both the first and second voxels:

removing, from a plurality of links stored for a non-selected one of the first or second voxels, one or more links to additional voxels non-adjacent to the non-selected one of the first or second voxels;

removing, from the additional voxels non-adjacent to the non-selected one of the first or second voxels, one or more links to the non-selected one of the first or second voxels;

storing, for the single merged voxel, a plurality of links to the additional voxels non-adjacent to the first and second voxels; and storing, for the additional voxels non-adjacent to the first and second voxels, a plurality of links to the single merged voxel.

20. A non-transitory computer-readable medium storing instructions that, when executed, direct a processor of a computing device to:

generate, based on a first depth dataset that is captured at a particular moment in time by a first capture device having a first viewpoint, a first voxelized representation of an object with respect to a voxel space;

generate, based on a second depth dataset that is captured synchronously with the first depth dataset at the particular moment in time by a second capture device having a second viewpoint different from the first viewpoint, a second voxelized representation of the object with respect to the voxel space;

identify, based on a first normal of a first voxel included in the first voxelized representation and a second normal of a second voxel included in the second voxelized representation, a mergeable intersection between the first and second voxels, the mergeable intersection corresponding to a surface point on the object for which the first and second voxels include redundant information for the particular moment in time; and generate, based on the first and second voxelized representations, a merged voxelized representation of the object with respect to the voxel space and for the particular moment in time, the merged voxelized representation including a single merged voxel generated, based on the identified mergeable intersection, to represent both the first and second voxels at the particular moment in time.

\* \* \* \* \*